UNITED STATES PATENT OFFICE 2,581,844

AQUEOUS EMULSION POLYMERIZATION OF VINYL ACETATE IN THE PRESENCE OF METHANOL

Watson Eggleston, Sanborn, N. Y., assignor to E. I. du Pont de Nemours & Company, Wilmington, Del., a corporation of Delaware No Drawing. Application December 4, 1948, Serial No. 63,637

8 Claims. (Cl. 260—89.1)

This invention relates to the aqueous emulsion polymerization of vinyl acetate.

The large scale production of polyvinyl acetate by aqueous emulsion polymerization of vinyl acetate, although practiced for a considerable period of years, is subject to two objectionable characteristics.

A layer of polyvinyl acetate builds up progressively on all internal surfaces of the containers in which the polymerization takes place. For example, after two or three batches of polymer have been made in a polymerization kettle, the layer of polymer adhering to the inside walls of the kettle is so heavy as to prevent sufficient heat transfer to adequately cool the kettle contents through the kettle cooling jacket. Consequently, after two or three polymerization runs, it has been necessary for a man to enter the kettle and remove the polymer layer with hand scrapers.

Secondly, polyvinyl acetate produced by aqueous emulsion polymerization always contains a small amount of vinyl acetate monomer which is difficult to remove. It is customary to remove vinyl acetate monomer from polyvinyl acetate by passing steam through the polymerization mass. Steam distillation of the reaction mass, however, only lowers the vinyl acetate content of the polymer to a given level after which additional steaming fails to remove material amounts of the monomer.

It is an object of this invention to provide a process for the aqueous emulsion polymerization of vinyl acetate which will greatly reduce the progressive building up of polymer layers on internal surfaces of a polymerization kettle.

It is another object of this invention to provide a process for the aqueous emulsion polymerization of vinyl acetate to produce a polymerization product from which vinyl acetate monomer will be removed to a greater extent by a subsequent steaming operation.

Other objects of the invention will be apparent from the description that follows.

The objects of this invention may be accomplished, in general, by carrying out the aqueous emulsion polymerization of vinyl acetate in the presence of 0.05% to 2.0% of methanol, based on the weight of vinyl acetate. The methanol may be added to the polymerization reaction mass prior to or during the polymerization reaction.

This invention is restricted to the polymerization of a polymerizable monomer in an aqueous emulsion in which the polymerizable monomer consists entirely of vinyl acetate, or in which the monomer is comprised of such a predominating amount of vinyl acetate (95% or more) that the monomeric polymerizable composition has substantially the character of an aqueous emulsion of vinyl acetate, and the resulting polymer has the character of polymerized vinyl acetate.

The invention is further restricted to the aqueous emulsion or granular polymerization of the vinyl acetate, i. e., the polymerization of vinyl acetate monomer in a water emulsion or dispersion containing at least 30% water, a small amount of a polymerization catalyst, and an emulsifying agent. Although attempts have been made to differentiate between granular and emulsion polymerization, this distinction represents mainly a difference in particle size as obtained by the use of different emulsifying or dispersing agents. Inasmuch as the polymerization of vinyl acetate in accordance with the present invention can be carried out equally well with either process, they will be considered equivalent and will be generally referred to as emulsion polymerization processes throughout the specification and claims. Any of the known emulsifying agents used in granular or emulsion polymerization can be used in carrying out the principles of the present invention, for example, gelatin, polyvinyl alcohol, organic sulfates, organic sulfonates, salts of sulfonated oils, and the like.

The process of this invention may be carried out with the use of any of the commonly used emulsion polymerization catalysts, for example, organic peroxides such as benzoyl peroxide or lauryl peroxide, inorganic peroxides such as hydrogen peroxide and sodium peroxide, per acid salts such as persulfates, perborates and percarbonates.

As above stated, the amount of methanol added to the polymerization reaction mass should be between 0.05% and 2.0% by weight of the vinyl acetate monomer added to the reaction mass. The addition of about 1% appears to be optimum. The addition of less than 0.05% is insufficient to accomplish the objects of the invention, and the addition of more than 2% will fail to produce any improved results and will therefore constitute waste or necessitate an expensive recovery problem.

The well-known process of aqueous emulsion polymerization of vinyl acetate generally comprises the formation of an emulsion of vinyl acetate in at least 30% by weight of water in the presence of an emulsifying agent and a polymerization catalyst. The emulsion is heated to begin the polymerization reaction. The temperature is controlled during polymerization to maintain the mass under refluxing conditions, a temperature between 60° C. and 95° C. After about three to six hours, the polymerization will be substantially complete, 93% to 99% complete. The solid particles of polyvinyl acetate are then filtered from the mass and subjected to 15 to 75 minutes' steaming to remove vinyl acetate monomer.

It is also frequently customary to add polymerization arresters, for example, diphenylamine, para-tertiary-amyl-phenol, copper resinate or thiourea, to the polymerization reaction mass to halt polymerization at the proper point. The amount of residual vinyl acetate monomer in the polymer, in some cases, depends upon the particular polymerization arrester used. For example, the use of thiourea as a polymerization arrester will cause the presence of almost twice as much vinyl acetate monomer in the polyvinyl acetate after steaming than in the case of a similar use of para-tertiary-amyl-phenol. The process of this invention has particular utility in vinyl acetate polymerization processes, e. g., processes using thiourea as polymerization arrester, in which relatively large amounts of residual monomer are present after the steaming operation. The presence of a small amount of methanol, however, is useful in any aqueous emulsion polymerization of vinyl acetate to reduce the amount of vinyl acetate in the polymer to a materially smaller amount than would be present in the absence of the methanol.

The following examples are given to illustrate the effectiveness of small quantities of methanol to reduce the amount of vinyl acetate in polyvinyl acetate after steaming, and to reduce the building up of polyvinyl acetate layers on the internal surfaces of a polymerization kettle.

*Example I*

In a one-liter, three-necked, polymerization flask provided with a sealed stirrer, thermometer and reflux condenser are placed 375 parts vinyl acetate, 360 parts water, and one part of a 6% aqueous solution of polyvinyl alcohol having a saponification number of between 127 and 157. The flask was placed in a water bath and heated to 40° C. Ten (10) parts of a 2% aqueous sodium bicarbonate solution, 1.5 parts of 3% aqueous solution of hydrogen peroxide, and 4.0 parts of methanol are then added. The bath temperature is gradually increased to maintain the reaction mass under reflux (63° C.–94° C.). After five hours and forty minutes, 0.2 part of thiourea is added as a polymerization arrester. Steam at a gauge pressure of ten pounds per square inch is then passed for a period of thirty minutes through the reaction mass by means of laboratory glass tubing.

The polyvinyl acetate is then filtered from the reaction mass and washed with distilled water and then dried by heating in a drying oven at a temperature of 60° C. The resulting polymer contains less than 0.5% vinyl acetate monomer.

A similar run with the omission of the methanol contains 1% residual vinyl acetate even after steaming for a period of one and one-half hours.

*Example II*

Repeated batches of polyvinyl acetate are produced in a jacketed polymerization kettle provided with a stirrer, thermometer, and reflux condenser from charges consisting of 3000 pounds vinyl acetate, 2000 pounds water, 13 pounds of 6% aqueous solution of polyvinyl alcohol having a saponification number of about 150, and 3 pounds of benzoyl peroxide. The repeated batches are heated to about 63° C. to start the polymerization, after which the temperature of the kettle is regulated by passing liquid at the required temperature through the jacket to maintain the reaction mass at reflux temperature for a period of five hours. Steam at 10 pounds per square inch gauge pressure is then passed through the kettle for one hour to remove vinyl acetate monomer. The reaction mass is then withdrawn from the kettle and the polymer filtered, centrifuged and dried.

Although polyvinyl acetate is found to adhere to the internal walls of the kettle and slowly builds up in thickness, eight to ten successive batches can be made in the kettle before cleaning of the walls becomes necessary.

A similar series of batches but with methanol omitted from the charges is subject to such great adherence of polymer and rapid build-up in thickness that after two to three batches the internal kettle walls must be cleaned by reason of inadequate heat transfer from the jacket to the kettle contents.

The polymerization of vinyl acetate in accordance with the invention herein described is not to be limited to described details. It is understood that the polymerization may be carried out in the presence of other additives, for example, anti-foaming agents, plasticizers, pigments, etc., in accordance with known polymerization procedures.

Reference in the specification and claims to parts, proportions and percentages, unless otherwise specified, refers to parts, proportions and percentages by weight.

Since it is obvious that many changes and modifications can be made in the above described details without departing from the nature and spirit of the invention, it is to be understood that the invention is not to be limited to said details except as set forth in the appended claims.

What is claimed is:

1. In a process for the aqueous emulsion polymerization of vinyl acetate, the step comprising adding to an aqueous emulsion of vinyl acetate before completion of the polymerization thereof between 0.05% and 2.0%, based on the weight of the vinyl acetate, of methanol and polymerizing said vinyl acetate in the presence of said added methanol.

2. In a process for the aqueous emulsion polymerization of vinyl acetate, the step comprising adding to an aqueous emulsion of vinyl acetate, prior to the polymerization thereof, between 0.05% and 2.0%, based on the weight of the vinyl acetate, of methanol and polymerizing said vinyl acetate in the presence of said added methanol.

3. In a process for the aqueous emulsion polymerization of vinyl acetate, the step comprising adding to an aqueous emulsion polymerization reaction mass, during the polymerization, between 0.05% and 2.0%, based on the weight of the vinyl acetate added to the reaction mass, of methanol.

4. In a process for the aqueous emulsion polymerization of vinyl acetate, the steps comprising adding to an aqueous emulsion of vinyl acetate between 0.05% and 2.0%, based on the weight of vinyl acetate, of methanol, polymerizing said vinyl acetate, and passing steam through the polymerized reaction mass for the removal of vinyl acetate monomer.

5. In a process for the aqueous emulsion polymerization of vinyl acetate, the steps comprising adding to an aqueous emulsion of vinyl acetate, prior to the polymerization thereof, between 0.05% and 2.0%, based on the weight of vinyl acetate, of methanol, polymerizing said vinyl acetate, and passing steam through the polymerized reaction mass for the removal of vinyl acetate monomer.

6. In a process for the aqueous emulsion polymerization of vinyl acetate, the steps comprising adding to an aqueous emulsion polymerization reaction mass, during the polymerization, between 0.05% and 2.0%, based on the weight of the vinyl acetate added to the reaction mass, of methanol, polymerizing said vinyl acetate, and passing steam through the polymerized reaction mass for the removal of vinyl acetate monomer.

7. In a process for the aqueous emulsion polymerization of vinyl acetate, the steps comprising adding to an aqueous emulsion polymerization reaction mass between 0.05% and 2.0% of methanol, polymerizing said vinyl acetate, adding a polymerization arrester to said mass, and passing steam through said mass to remove vinyl acetate monomer therefrom.

8. In a process for the aqueous emulsion polymerization of vinyl acetate, the steps comprising adding to an aqueous emulsion polymerization reaction mass between 0.05% and 2.0%, based on the weight of the vinyl acetate, of methanol, polymerizing said vinyl acetate, adding thiourea as a polymerization arrester to said mass, and passing steam through said mass to remove vinyl acetate monomer therefrom.

WATSON EGGLESTON.

REFERENCES CITED

The following references are of record in the file of this patent:

UNITED STATES PATENTS

| Number | Name | Date |
|---|---|---|
| 2,338,517 | Kitani et al. | Jan. 4, 1944 |
| 2,453,655 | Bryant | Nov. 9, 1948 |